(12) United States Patent
Chou

(10) Patent No.: US 7,935,765 B2
(45) Date of Patent: *May 3, 2011

(54) MISCIBLE BLENDS OF ETHYLENE COPOLYMERS WITH IMPROVED TEMPERATURE RESISTANCE

(75) Inventor: Richard T. Chou, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/464,994

(22) Filed: May 13, 2009

(65) Prior Publication Data

US 2009/0227739 A1    Sep. 10, 2009

Related U.S. Application Data

(63) Continuation of application No. 11/315,987, filed on Dec. 21, 2005, now abandoned, which is a continuation-in-part of application No. 10/510,808, filed as application No. PCT/US03/16353 on May 23, 2003, now Pat. No. 7,199,188.

(60) Provisional application No. 60/383,296, filed on May 23, 2002.

(51) Int. Cl.
C08L 23/04 (2006.01)
C08L 33/02 (2006.01)
C08L 33/04 (2006.01)
C08L 33/06 (2006.01)
C08L 35/02 (2006.01)

(52) U.S. Cl. ......... 525/221; 525/222; 525/224; 525/240
(58) Field of Classification Search .................. 525/221, 525/222, 224, 240

See application file for complete search history.

(56) References Cited

U.S. PATENT DOCUMENTS

| | | |
|---|---|---|
| 3,388,186 A | 6/1968 | Kray et al. |
| 3,465,059 A | 9/1969 | Seven et al. |
| 3,668,274 A | 6/1972 | Owens et al. |
| 3,845,163 A | 10/1974 | Murch |
| 3,969,434 A | 7/1976 | Powell et al. |
| 4,174,358 A | 11/1979 | Epstein |
| RE30,322 E | 7/1980 | Hammer et al. |
| 4,230,830 A | 10/1980 | Tanny et al. |
| 4,351,931 A | 9/1982 | Armitage |
| 4,430,468 A | 2/1984 | Schumacher |
| 4,434,258 A | 2/1984 | Schumacher et al. |
| 4,552,819 A | 11/1985 | Hibino |
| 4,673,620 A | 6/1987 | Shulman et al. |
| 4,701,359 A | 10/1987 | Akao |
| 4,849,476 A | 7/1989 | Mashita et al. |
| 4,861,676 A | 8/1989 | Lee |
| 4,861,677 A | 8/1989 | Lee |
| 4,948,669 A | 8/1990 | Rolland |
| 5,114,658 A | 5/1992 | Katsaros |
| 5,179,164 A | 1/1993 | Lausberg et al. |
| 5,225,482 A | 7/1993 | Nakagawa et al. |
| 5,240,894 A | 8/1993 | Burkhardt et al. |
| 5,264,405 A | 11/1993 | Canich |
| 5,272,236 A | 12/1993 | Lai et al. |
| 5,278,272 A | 1/1994 | Lai et al. |
| 5,283,120 A | 2/1994 | Koehnlein et al. |
| 5,346,963 A | 9/1994 | Hughes et al. |
| 5,408,000 A | 4/1995 | Katsaros et al. |
| 5,507,475 A | 4/1996 | Seel et al. |
| 5,516,583 A | 5/1996 | Zhang et al. |
| 5,859,137 A | 1/1999 | Chou |
| 5,965,255 A | 10/1999 | Ichimura et al. |
| 6,008,297 A | 12/1999 | Tanaka et al. |
| 6,177,516 B1 | 1/2001 | Hudak |
| 6,300,386 B1 | 10/2001 | Karukaya et al. |
| 6,465,107 B1 | 10/2002 | Kelly |
| 6,528,550 B1 | 3/2003 | Hsu et al. |
| 6,756,443 B2 | 6/2004 | Feinberg |
| 6,759,480 B1 | 7/2004 | Bouilloux et al. |
| 6,784,245 B2 | 8/2004 | Buhring |
| 7,199,188 B2 * | 4/2007 | Chou ........................ 525/179 |
| 7,270,862 B2 | 9/2007 | Flat et al. |
| 7,279,520 B2 | 10/2007 | Hausmann et al. |
| 2002/0099141 A1 | 7/2002 | Sato et al. |
| 2004/0249071 A1 | 12/2004 | McFaddin et al. |
| 2005/0228145 A1 | 10/2005 | Lacroix et al. |
| 2006/0020086 A1 | 1/2006 | Smith |

FOREIGN PATENT DOCUMENTS

| | | |
|---|---|---|
| EP | 0212575(A2) | 3/1987 |
| EP | 0893469(A1) | 1/1999 |
| WO | WO 01/18141(A1) | 3/2001 |
| WO | WO 02/28974(A2) | 4/2002 |
| WO | WO 02/102898(A1) | 12/2002 |
| WO | WO 03/099930(A1) | 12/2003 |

OTHER PUBLICATIONS

Ann T. Thayer, "Metallocene Catalysts Initiate New Era in Polymer Synthesis", Chemical and Engineering News, Sep. 11, 1995, pp. 15-20.

Laird et al, "A perspective on some recent developments in metallocene catalysts", Rubber World, Oct. 1997, pp. 42-86.

* cited by examiner

Primary Examiner — Nathan M Nutter

(57) ABSTRACT

The present invention is a composition useful as an impact modifier for polyamide compositions. In one embodiment, impact modifiers of the present invention are ethylene maleic anhydride copolymers having at least 3% maleic anhydride functionality. Compositions comprising copolymers of ethylene and maleic anhydride or its functional equivalents and ethylene copolymers with polar comonomers are disclosed. The compositions provide miscible blends and exhibit improved properties, such as increased temperature resistance and mechanical strength, compared to pure ethylene copolymers with polar comonomers.

9 Claims, No Drawings

MISCIBLE BLENDS OF ETHYLENE COPOLYMERS WITH IMPROVED TEMPERATURE RESISTANCE

CROSS REFERENCE TO RELATED APPLICATION

This application is a continuation of pending U.S. application Ser. No. 11/315,987 filed Dec. 21, 2005, which is a continuation in part of U.S. application Ser. No. 10/510,808 filed Oct. 6, 2004, now U.S. Pat. No. 7,199,188 B2, which is the U.S. national stage application of International Application No. PCT/US03/16353 filed May 23, 2003 and published as WO03/099930A1, now expired, which claims priority to U.S. Provisional Application Ser. No. 60/383,296 filed May 23, 2002.

BACKGROUND OF THE INVENTION

1. Field of the Invention

This invention relates to blended polyamide compositions, and to a process of preparing same. This invention relates to compositions comprising copolymers of ethylene and maleic anhydride or its functional equivalents and copolymers of ethylene with polar comonomers that provide products having improved properties.

2. Description of the Related Art

Thermoplastic resins used as plastics in engineering applications can require additives to modify, that is, increase the impact resistance of said thermoplastic resins. U.S. Pat. No. 3,845,163 discloses blends of 60 to 85 weight percent polyamide and an acid-containing olefin polymer. U.S. Pat. No. 3,388,186 discloses a polyamide composition that includes an ethylene-containing grafted copolymer. U.S. Pat. No. 3,465,059 similarly discloses a polyamide composition that includes an ethylene-containing grafted copolymer. U.S. Pat. No. 3,668,274 discloses polycarbonamides that have been modified with an elastomeric phase and a rigid phase thermoplastic stage containing amine-reactive moieties.

Maleic anhydride grafted polyolefins (maleated polyolefins) and ethylene copolymers are widely used as impact modifiers for engineering polymers, particularly for polyamide polymer resins. Maleated polyolefins can be the preferred modifiers for use with polyamide resins. U.S. Pat. No. 4,174,358 discloses copolymers of ethylene/maleic anhydride as tougheners for polyamides having a number average molecular weight of at least 5000. U.S. Pat. No. 5,346,963 describes the use of maleic anhydride-grafted substantially linear ethylene polymers and blends thereof with olefin polymers and also with non-olefin polymers such as polyamides. U.S. Pat. No. 6,008,297 describes polyamide compositions that include acid-grafted ethylene/alpha-olefin copolymers for improved low-temperature impact strength.

The use of maleated polyolefins is not trouble-free, however. There are limitations with using maleated polyolefins as impact modifiers. For example, it can be difficult to reach a high level of grafting in a maleated polyolefin. Grafting, as conventionally practiced, involves the use of a free-radical initiator. To achieve higher levels of grafting, which can be desirable, it can be necessary to include the free-radical initiator in a higher concentration. Using the initiator at higher concentrations can cause undesirable side reactions, such as crosslinking and chain scission. For this reason, grafting of maleic anhydride at a concentration of greater than 2 weight % can be difficult and troublesome. In addition, controlling the quality and consistency of maleated polyolefins—particularly those having higher concentrations of maleic anhydride grafting—can be troublesome. By-products, unreacted monomers, and crosslinking can significantly detract from the quality of maleated polyolefins at any grafting level, but this can be more of a problem particularly as the grafting level increases. Further, the cost of producing maleated polyolefins with high maleic graft levels can be substantial.

Ethylene copolymers that include reactive functional groups such as maleic anhydride can be readily obtained by a high-pressure free radical process. However, these copolymers generally are not good impact modifiers for polyamide polymer resins.

It would be desirable to prepare an impact modifier for polyamide polymer resins that are effective tougheners for polyamide resins and do not have the problems associated with high levels of grafting in maleated polyolefins.

SUMMARY OF THE INVENTION

The present invention is a toughened polyamide composition, comprising (1) from about 50 to about 98 weight % of a polyamide polymer resin, and (2) from about 2 to about 50 weight % of an impact modifier composition comprising (a) from about 10 to about 50 weight % of a copolymer prepared from ethylene, a functional comonomer and optionally a third comonomer, wherein the functional comonomer is included in the range of from about 3 to about 15 weight % in the copolymer; and (b) from about 50 to about 90 weight % of an ethylene-based polymer.

In another aspect, this invention provides a composition comprising:

(c) a copolymer obtained from copolymerization of ethylene and maleic anhydride or its functional equivalent, in an amount from about 5 to about 95 weight % of the composition; and (d) at least one ethylene copolymer obtained from copolymerization of ethylene with a polar monomer wherein said polar comonomer is present in the copolymer in an amount of from 6 to 40 weight %, wherein said copolymer is selected from the group consisting of ethylene/vinyl acetate copolymers, ethylene/alkyl (meth)acrylate copolymers and ethylene/(meth)acrylate/carbon monoxide terpolymers, in an amount from about 5 to about 95 weight % of the composition.

DETAILED DESCRIPTION OF THE INVENTION

In one embodiment, the present invention is a composition useful as an impact modifier for polyamide polymer compositions. The composition comprises as one component a maleated polyolefin which is a copolymer of ethylene and maleic anhydride, or its functional equivalent. Such equivalents include derivatives of maleic anhydride such as maleic acid and/or salts thereof, maleic acid diesters, maleic acid monoesters, itaconic acid, fumaric acid, fumaric acid monoester, or mixtures of any of these. Maleated polyolefins also include E/X/Y terpolymers, wherein: E is ethylene; X is a monomer selected from the group consisting of vinyl acetate, (meth)acrylic acid, and/or derivatives thereof; and Y is maleic anhydride or its functional equivalent. Examples of monomers suitable for inclusion as component X are: (Meth)acrylic acid derivatives including acids, salts, esters, anhydrides, or other acid derivatives that are known to one of ordinary skill in the chemical arts. Preferred monomers suitable for inclusion as component X are (meth)acrylic acid esters of $C_1$ to $C_4$ alcohols. Preferred terpolymers include those wherein X is less than 10 weight %, and preferably less than 5 weight % of the terpolymer. Methyl acrylate and butyl acrylate are particular examples of acrylate monomers suitable for inclusion as component X. Suitable as Y components are: Maleic diesters or monoesters (wherein one carboxyl group of the maleic moiety is esterified and the other is a carboxylic acid, also known as maleic half-esters or alkyl hydrogen maleates) include esters of $C_1$ to $C_4$ alcohols, such as, for example, methyl, ethyl, n-propyl, isopropyl, and n-butyl alcohols. Preferably the maleated polyolefin includes maleic anhydride, maleic acid diesters, and/or maleic acid half-esters. More preferably the maleated polyolefin includes maleic anhydride and/or maleic acid half-esters.

Other copolymers include: ethylene/maleic acid monoester/n-butyl (meth)acrylate; ethylene/maleic acid monoester/methyl (meth)acrylate; and ethylene/maleic acid mono-ester/ethyl (meth)acrylate terpolymers. For such copolymers, the alcohol moiety used in the maleic acid monoester comonomer can be the same as that used in the alkyl (meth)acrylate comonomer, or it can be different. Of particular note are ethylene/alkyl hydrogen maleate copolymers wherein the alkyl group is ethyl (E/EHM copolymers).

Maleated polyolefins useful herein are obtained by a high pressure free radical polymerization process. A high pressure process suitable for use in the practice of the present invention is described, for example, in U.S. Pat. No. 4,351,931.

The modifier composition comprises as a second component an ethylene-based polymer (base resin). The base resin can be: high density polyethylenes (HDPE); low density polyethylenes (LDPE); linear low density polyethylenes (LLDPE); ultra low density polyethylenes (ULDPE); copolymers of ethylene and alpha-olefin monomer using a metallocene catalyst (metallocene polyethylenes, or MPE); ethylene/propylene copolymers; or terpolymers such as ethylene/propylene/diene monomer (EPDM). Preferably, the base resin is a soft polymer. More preferably, the base resin is MPE, LLDPE and, most preferably, the base resin is MPE.

Without being held to theory, MPE can be preferred in the practice of the present invention because of its substantially linear structure and narrow molecular weight distribution of MPE. MPE technology is capable of making lower density MPE with high flexibility and low crystallinity, which can be desirable as the second component of this invention.

MPE technology is described in, for example, U.S. Pat. Nos. 5,272,236; 5,278,272, 5,507,475, 5,264,405, and 5,240,894.

Suitable base resins can also include polar ethylene copolymers that are obtained from copolymerization of ethylene with a polar monomer. Such suitable polar copolymers include ethylene acrylate copolymers and ethylene vinyl acetate copolymers, including ethylene acrylic acid copolymers, ethylene methacrylic acid copolymers, salts derived from ethylene acrylic and/or methacrylic acid copolymers, ethylene acrylic ester copolymers, ethylene methacrylic ester copolymers, and/or mixtures of any of these.

Preferred polar ethylene copolymers include ethylene/vinyl acetate copolymers and ethylene/alkyl (meth)acrylate copolymers. Preferred soft polymers for use as the base resin in the polyamide modifier composition are ethylene acrylate copolymers.

Ethylene/Vinyl Acetate Copolymers

The compositions of this invention may comprise at least one ethylene/vinyl acetate (EVA) copolymer, which are inclusive of EVA dipolymers and EVA terpolymers. The term "EVA dipolymers" describes copolymers derived from the copolymerization of ethylene and vinyl acetate. The term "EVA terpolymers" describes copolymers derived from the copolymerization of ethylene, vinyl acetate and an additional comonomer.

The relative amount of the vinyl acetate comonomer incorporated into ethylene/vinyl acetate copolymers of the present invention can be varied to include a few weight percent or even greater, the amount of vinyl acetate included can be selected depending upon the degree of polarity desirable from the polar copolymer in the blended composition. It can be desirable to include 45 wt % of vinyl acetate or more.

The ethylene/vinyl acetate copolymer can be included in any amount in the range of from about 1 to about 99% by weight, but preferably vinyl acetate is included in an amount of from about 6 to about 40% by weight, especially from 12 to 32% by weight. The ethylene/vinyl acetate copolymer may optionally be modified by methods well known in the art, including modification with an unsaturated carboxylic acid or its derivatives, such as maleic anhydride or maleic acid. The ethylene/vinyl acetate copolymer preferably has a melt index, measured in accordance with ASTM D 1238 at 190° C., of from 0.1 to 1000 g/10 minutes, and especially from 0.3 to 30 g/10 minutes.

Ethylene/vinyl acetate copolymers suitable for use in this invention include those available from E. I. du Pont de Nemours & Co. (DuPont), Wilmington, Del. under the Elvax® tradename.

A mixture of two or more different ethylene/vinyl acetate copolymers can be used in the miscible blend compositions of the present invention in place of a single copolymer as long as the average values for the comonomer content will be within the range indicated above. Particularly useful properties may be obtained when two or more properly selected ethylene/vinyl acetate copolymers are used in compositions of the present invention.

Ethylene/Alkyl (Meth)acrylate Copolymers

The term "(meth)acrylic acid" means methacrylic acid and/or acrylic acid. Likewise, the terms "(meth)acrylate" and "alkyl (meth)acrylate" means esters of methacrylic acid and/or acrylic acid. The terms "ethylene acrylate copolymers," "ethylene/alkyl (meth)acrylate copolymers" and the like includes copolymers of ethylene and alkyl (meth)acrylates wherein the alkyl moiety contains from one to six carbon atoms. Examples of alkyl acrylates include methyl acrylate, ethyl acrylate and butyl acrylate. Ethylene/methyl acrylate (EMA) means a copolymer of ethylene and methyl acrylate. Ethylene/ethyl acrylate (EEA) means a copolymer of ethylene and ethyl acrylate. Ethylene/butyl acrylate (EBA) means a copolymer of ethylene and butylacrylate. Of note are ethylene/butyl acrylate copolymers prepared from i-butyl acrylate comonomers (EiBA) and ethylene/butyl acrylate copolymers prepared from n-butyl acrylate comonomers (EnBA).

The relative amount of the alkyl acrylate comonomer incorporated into the ethylene/alkyl acrylate copolymer can, in principle, vary broadly from a few weight percent up to as high as 40 weight percent of the total copolymer or even higher. Similarly, the choice of the alkyl group can, again in principle, vary from a simple methyl group up to a six-carbon atom alkyl group with or without significant branching. The relative amount and choice of the alkyl group present in the alkyl acrylate ester comonomer can be viewed as establishing how and to what degree the resulting ethylene copolymer is to be viewed as a polar polymeric constituent in the blended composition.

Preferably, the alkyl group in the alkyl acrylate comonomer has from one to four carbon atoms and the alkyl acrylate comonomer has a concentration range of from 6 to 40 weight percent of the ethylene/alkyl acrylate copolymer, preferably from 12 to 32 weight %.

A mixture of two or more different ethylene/alkyl (meth) acrylate copolymers can be used in the blended compositions of the present invention in place of a single copolymer as long as the average values for the comonomer content will be within the range indicated above. Particularly useful properties may be obtained when two or more properly selected ethylene/alkyl (meth)acrylate copolymers are used in blends of the present invention.

Ethylene/alkyl acrylate copolymers can be prepared by processes well known in the polymer art using either autoclave or tubular reactors. The copolymerization can be run as a continuous process in an autoclave: ethylene, the alkyl acrylate, and optionally a solvent such as methanol (see U.S. Pat. No. 5,028,674) are fed continuously into a stirred autoclave such as the type disclosed in U.S. Pat. No. 2,897,183, together with an initiator.

In a particularly preferred embodiment, the ethylene copolymer is of the type that is prepared in a tubular reactor, according to the procedure described in the article "High Flexibility EMA Made from High Pressure Tubular Process" (Annual Technical Conference-Society of Plastics Engineers (2002), 60th (Vol. 2), 1832-1836).

The manufacturing of the tubular reactor ethylene/alkyl acrylate copolymers is preferably in a high pressure, tubular reactor at elevated temperature with additional introduction of reactant comonomer along the tube and not merely manufactured in a stirred high-temperature and high-pressure autoclave type reactor. However, it should be appreciated that similar ethylene/alkyl acrylate copolymeric material can be produced in a series of autoclave reactors wherein comonomer replacement is achieved by multiple zone introduction of reactant comonomer as taught in U.S. Pat. Nos. 3,350,372; 3,756,996; and 5,532,066, and as such these high melting point materials should be considered equivalent for purposes of this invention.

Ethylene/alkyl acrylate copolymers suitable for use in this invention include those available from DuPont) under the Elvaloy® AC tradename.

The modifier composition can include from about 10 to about 50 weight %, based on the total weight of the modifier composition, of the ethylene maleic anhydride copolymer, or its functional equivalent. Preferably, the modifier includes from about 10 to about 45 weight % of the maleated polyolefin, more preferably the composition includes from about 15 to about 40 weight % of the maleated polyolefin, and most preferably from about 20 to about 35 weight % of the maleated polyolefin.

The modifier can include from about 50 to about 90 weight % of the ethylene-based polymer, based on the total weight of the modifier composition. Preferably the modifier includes from about 55 to about 90 weight %, more preferably from about 60 to about 85 weight %, and most preferably from about 70 to about 85 weight % of the ethylene-based polymer.

A modifier composition of the present invention is particularly useful for improving the impact resistance of polyamide compositions that include the modifier compositions of the present invention. Without being held to theory, it is believed that the anhydride functionality aids in dispersing the polymer modifier in the polymer matrix. In addition, it is believed that the anhydride functionality assists in enhancing the interfacial adhesion between the modifier and the polymer matrix. Modifier compositions of the present invention can include a higher concentration of grafted anhydride functionality, which can enhance the effectiveness of the modifier composition as a polyamide toughener, without detracting from the other desirable characteristics of the modified polyamide composition.

In another embodiment, the present invention is a polyamide composition comprising the modifier of this invention.

The polyamide can be any that is commercially available, such as for example nylon 6, nylon 66, nylon 612, nylon 11 or nylon 12. Various nylon grades can be purchased commercially from E.I. DuPont de Nemours & Company. Alternatively, methods for preparing polyamides suitable for use in the present invention are known and conventional. For example, suitable polyamides can be prepared according to methods described in U.S. Pat. Nos. 2,071,250; 2,130,523; 3,393,210. The polyamide compositions of the present invention can include from about 50 to about 98 weight %, based on the weight of the total polyamide composition, of polyamide. Preferably the polyamide composition includes from about 60 to about 98 weight % polyamide, more preferably from about 70 to about 98 weight % polyamide, most preferably from about 80 to about 98 weight % polyamide.

The modifier is included in the polyamide composition in the range of from about 2 to about 50 weight % of the total polyamide composition. Preferably the modifier is included in an amount of from about 2 to about 40 weight %, more preferably from about 2 to about 30 weight %, and most preferably from about 2 to about 20 weight % of the total polyamide.

The modifier composition and/or the polyamide composition can include optional components, so long as they do not interfere with the basic and novel characteristics of the polyamide composition of the present invention. Such optional components include additives used in polymeric materials including plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, foaming or blowing agents, processing aids, slip additives, antiblock agents such as silica or talc, release agents, tackifying resins and/or mixtures thereof. Such additives are described in the Kirk Othmer *Encyclopedia of Chemical Technology*, for example, and are known or can be known to one of ordinary skill in the art as useful in the practice of the present invention. For example, components that interfere with the interfacial adhesion between the modifier and the polyamide polymer matrix, or detract from the strength or quality of the polyamide polymer composition, or add substantial costs to the manufacture of the presently claimed polyamide composition, or are otherwise deleterious to the toughness or impact resistance of the polyamide composition are considered to interfere with some of the basic characteristics of the presently claimed invention. Other characteristics that were not exemplified above may nonetheless still be considered basic and/or novel to the presently claimed invention. For example, color, smell, appearance, feel, safety in handling or using, are considered basic characteristics of the present invention. Any added component that interferes with these characteristics, whether mentioned above or not, can be excluded from the composition claimed herein. Any optional components, whether or not contemplated herein, that negatively effect the basic novelty of the present invention can be excluded from the claimed invention.

Compositions of this invention comprising copolymers of ethylene and maleic anhydride or functional equivalents, such as alkyl hydrogen maleates, and copolymers of ethylene with other polar comonomers (polar ethylene copolymers) can be used to modify polyamide as described above. These compositions also have uses other than as polyamide modifiers, as described below.

The presence of polar monomers in certain ethylene copolymers differentiate them from other polyolefins. The value of these ethylene copolymers increases in general as the polar comonomer content increases. The polarity is desirable for a number of attributes including transparency, adhesion, painting and printing, softness, flexibility, toughness (including low-temperature toughness), and compatibility with other polar polymers, fillers and additives.

However, the deficiencies of ethylene copolymers with high polar comonomer content include poor temperature resistance and, often, lower mechanical strength. These deficiencies limit the applications of highly polar ethylene copolymers. For example, highly polar ethylene copolymers could be used to replace plasticized polyvinyl chloride (PVC), but the poor temperature resistance, in the range of 70 to 100° C., limits the use of highly polar ethylene copolymers in many such applications.

Compositions of this invention, comprising copolymers of ethylene and maleic anhydride or functional equivalents, such as alkyl hydrogen maleates, and copolymers of ethylene with other polar comonomers exhibit improved temperature resistance over the pure copolymers of ethylene with polar comonomers. The compositions can be used in applications where the incumbent ethylene copolymers fail because of poor temperature resistance, such as replacing plasticized PVC and soft thermoplastic urethanes (TPU). They also have improved adhesion and compatibility with other polar polymers, fillers and additives.

The inventor has also discovered that these compositions form miscible blends. Notably, the blends behave as single-phase materials and not as two-phase materials. The miscible blends provide improved temperature resistance while retaining other desirable properties such as transparency, painting and printing, softness, flexibility, and toughness (including low-temperature toughness).

The definition of the terms "miscible blend," "miscibility," and the like when used for a polymer blend system is best described in *Polymer-Polymer Miscibility*, O. Olabisi, L. Robeson and M. Shaw, Academic Press (1979). As a general definition, a miscible blend of a two-component system forms a homogeneous system with a single phase. In other words, the polymer of one component has some solubility in the other polymer of the second component. Because of the high molecular weights of polymeric materials, a true homogeneous system, such as a mixture of water and alcohol, cannot be achieved. As taught in "Polymer-Polymer Miscibility", Chapter 1, the term miscibility does not imply ideal molecular mixing but suggests that the level of molecular mixing is adequate to yield macroscopic properties expected of a single-phase material. In contrast, an immiscible blend of a two-component system remains a two-phase system, and the two-phase nature can often be revealed using optical microcopy or electron microscopy. Because of the two-phase nature of an immiscible blend, the properties are often dictated by the major component.

Compositions of this invention comprise a copolymer prepared from ethylene and a maleic anhydride or its functional equivalents as described above.

Such compositions comprise as a second component at least one ethylene copolymer obtained from copolymerization of ethylene with a polar monomer. Suitable copolymers include ethylene vinyl acetate copolymers (EVA's) and ethylene (meth)acrylate copolymers as previously described, or mixtures of any of these. Combinations of two or more polar ethylene copolymers, each having the same polar comonomer at different weight %, may be used. Combinations of two or more polar ethylene copolymers with different polar comonomers may also be used.

The compositions of the present invention possess varying properties and can be used in various kinds of applications. There are many applications where the existing highly polar EVA and E/alkyl acrylate copolymers cannot enter, mainly because of deficient temperature resistance. The compositions of this invention overcome this deficiency.

The compositions of this invention are suitable for replacing plasticized or flexible PVC in general because of their improved temperature resistance. The blends are particularly desirable as halogen-free replacements for PVC.

Another application is for decorative films for, for example, athletic shoe applications. The incumbent materials for such decorative films are thermoplastic urethanes (TPU).

The compositions are also useful for adhesive systems, for example, adhesive systems based on blends of EVA and E/EHM. The E/EHM introduces reactivity for crosslinking and adhesion to other substrates and higher temperature resistance for easy handling. A current approach to adhesive compositions is to blend EVA with maleic anhydride-grafted polyethylene (MAH-grafted-PE). However, as the polarity of the EVA increases, the compatibility between EVA and MAH-grafted-PE diminishes, resulting in an increasingly ineffective adhesive system with high polarity EVA. The compositions of this invention do not exhibit this behavior, allowing for effective high polarity adhesive compositions. High polarity blends of EVA or ethylene/alkyl acrylates and E/EHM are suitable for use as adhesive layers in multilayer structures such as films. They may be used as (co)extrudable adhesives for coextruded, extrusion coated or laminated films. For applications where a post-orientation step is involved, a miscible blend composition of this invention may sustain the adhesion much better than a current immiscible blend composition.

The high polarity of the blends of EVA or ethylene/alkyl acrylates and E/EHM are more compatible with additives such as antifog or antistatic agents than current compatibilizing agents, allowing for improved antifog or antistatic films. Furthermore, the presence of E/EHM provides for a higher usage temperature. Blends of E/EHM with EVA or ethylene/alkyl acrylates may also be used in high performance foam applications.

The compositions can be prepared by blending the polymeric ingredients and optional additives by use of conventional masticating equipment, for example, a rubber mill, Brabender Mixer, Banbury Mixer, Buss-Ko Kneader, Farrel continuous mixer or twin-screw continuous mixer. Mixing times should be sufficient to obtain homogeneous blends. For example, mixing times of about 5 minutes and mixing temperatures of 160° C. may be satisfactory.

The components used in the compositions of the present invention can be dry blended and subsequently melt blended in a twin-screw extruder and repelletized as is known in the art. For example, the blends can be prepared by melt mixing the components in a 30-mm twin-screw extruder, using a melt temperature of from 180° C. to 230° C.

Subsequently, these melt-blended, miscible resins can be converted and applied by a variety of techniques and processes. For example, the composition can be converted into a film by cast or blown film die extrusion techniques. As an alternative, the composition can be coextruded with other thermoplastic polymers to provide a multilayer structure. As a further alternative, a coextruded film can be created incorporating polar barrier resins such as polyamides, ethylene vinyl alcohol copolymer (EVOH) or polyester.

In other applications a composition of the present invention can be directly coated onto a substrate in processes well known in the art, including, for example, extrusion lamination, extrusion coating, coextrusion lamination and coextrusion coating.

The compositions may also be processed by various molding techniques such as injection molding, compression molding, injection blow molding and the like.

EXAMPLES

The following examples are illustrations of the present invention, and not intended to limit the scope of the present invention in any way.

Preparing Blends

The Examples in Table I and Table II were prepared by melt blending using a twin screw extruder with a mixing screw, using a melt temperature of between 280 and 300° C. for the samples in Table I, and using a melt temperature of between 260 and 280° C. for the samples listed in Table II.

Test Procedures

Melt flow index (MI) is measured using ASTM D-1238 using a 2160 gram weight, and measured at 190° C.

Izod impact was measured using ASTM D-256 using injection molded specimens. The molded bars were 5 inches long, ½ inch wide and ⅛ inch thick. The bars were cut in half and notches made 1¼ inches from the gate (near gate, listed in table as gate) and 3¾ inches from the gate (far from gate, listed in the table as far) because of possible orientation during molding, the impact results can be different from the two locations, as can be seen from the data in Table I and Table II.

Tensile strength was measured using ASTM D-638 using injection molded bars.

Materials Used in Table I

Nylon 66 employed is a commercial nylon 66, Zytel® 101, available from DuPont Co.

MPE employed is a commercial Engage 8100 with a density of 0.87 g/cc and a melt flow index of 1.0, available from DuPont Dow Co.

EMA-1 employed is a commercial copolymer of ethylene and methyl acrylate with 24 weight percent of methyl acrylate and a melt flow index of 2.0, available from DuPont Co.

E/EHM-a and E/EHM-b are copolymers of ethylene and ethyl hydrogen maleate (EHM), prepared in a pilot plant unit. E/EHM-a contains about 6 weight percent of EHM with a melt flow index of 30; E/EHM-b contains about 8 weight percent of EHM with a melt flow index of 30.

E/MAA/EHM is a terpolymer of ethylene, methacrylic acid (11 weight percent) and ethyl hydrogen maleate (6 weight percent) with a melt flow index of 90, prepared in a pilot plant unit.

Materials Used in Table II

The nylon 6 samples employed are Ultramide® B3 and Ultramide® B35, both available from BASF. LLDPE employed is a commercial resin with a density of 0.91 g/cc and a melt flow index of 1.0, available from Exxon Co. MPE, and both E/EHM-a and E/EHM-b are described above.

TABLE I

Toughened Nylon 66

| | Modifier | | Notched Izod Impact (ft-lbs) | | | Tensile |
| | Ethylene Copolymer (wt. %) | Functional Copolymer (wt. %) | R.T. (gate/far) | 0° C. (gate/far) | −20° C. (gate/far) | Strength R.T. (kpsi) |
|---|---|---|---|---|---|---|
| C1 | control | | 0.8 | | | 8.6 |
| | | | 0.8 | | | |
| C2 | MPE | | 0.8 | 0.7 | 0.6 | 7.4 |
| | (20%) | | 0.8 | 0.6 | 0.4 | |
| Ex. 1 | MPE | E/EHM-a | 14.7 | 2.9 | 2.1 | |
| | (15%) | (5%) | 18 | 10 | 2.6 | |
| Ex. 2 | MPE | E/MAA/EHM | 3.3 | 1.9 | 1.6 | 7.9 |
| | (15%) | (5%) | 15.3 | 2 | 1.4 | |
| Ex. 3 | MPE | E/EHM-b | 17.2 | 13.7 | 4.4 | |
| | (15%) | (5%) | 21.2 | 16.8 | 5.6 | |
| C3 | EMA-1 | | 1.63 | 1.2 | 0.8 | |
| | (20%) | | 3.2 | 1.7 | 0.9 | |
| Ex. 4 | EMA-1 | E/MAA/EHM | 14 | 3.6 | 2.4 | |
| | (15%) | (5%) | 19.1 | 5.6 | 2.2 | |
| Ex. 5 | EMA-1 | E/EHM-b | 7 | 3.2 | 2 | |
| | (15%) | (5%) | 16.2 | 4.8 | 1.9 | |

TABLE II

Toughened Nylon 6

| | | Modifier | | Notched Izod Impact (ft-lbs) | | | Tensile Strength |
| | Nylon 6 | Ethylene Copolymer (wt. %) | Functional Copolymer (wt. %) | R.T. (gate/far) | 0° C. (gate/far) | −20° C. (gate/far) | R.T. (kpsi) |
|---|---|---|---|---|---|---|---|
| C4 | Ultramide B35 | control | | 0.9 | 1 | 0.9 | 9.3 |
| | | | | 0.9 | 0.9 | 0.7 | |
| C5 | Ultramide B35 | MPE | | 1.6 | 1 | 0.9 | 6.7 |
| | | (20%) | | 1.5 | 0.9 | 0.7 | |
| Ex. 6 | Ultramide B35 | MPE | E/MAA/EHM | 18.3 | 11.3 | 3 | 8.3 |
| | | (15%) | (5%) | 12.7 | 4.4 | 3 | |
| Ex. 7 | Ultramide B35 | MPE | E/EHM-b | 26.8 | 20.7 | 7.9 | |
| | | (15%) | (5%) | 22.5 | 21.9 | 8.3 | |
| Ex. 8 | Ultramide B35 | MPE | E/EHM-b | 24.8 | 21.4 | 5.5 | |
| | | (17.5%) | (2.5%) | 21.3 | 20 | 5 | |
| Ex. 9 | Ultramide B3 | MPE | E/EHM-b | 7.7 | 2.9 | 1.9 | |
| | | (15%) | (5%) | 11.8 | 9.1 | 2.4 | |
| Ex. 10 | Ultramide B3 | MPE | E/EHM-a | 11.9 | 9.59 | 3.5 | |
| | | (15%) | (5%) | 14.3 | 13.4 | 3.3 | |
| C6 | Ultramide B35 | EMA-1 | | 2.6 | 1.7 | 0.9 | |
| | | (20%) | | 2.7 | 1.5 | 0.9 | |

TABLE II-continued

Toughened Nylon 6

| | | Modifier | | Notched Izod Impact | | | Tensile Strength |
| | | Ethylene | Functional | (ft-lbs) | | | |
| | Nylon 6 | Copolymer (wt. %) | Copolymer (wt. %) | R.T. (gate/far) | 0° C. (gate/far) | −20° C. (gate/far) | R.T. (kpsi) |
|---|---|---|---|---|---|---|---|
| Ex. 11 | Ultramide B35 | EMA-1 (15%) | E/EHM-a (5%) | 14 14.7 | 7.6 5 | 2.5 2.4 | |
| Ex. 12 | Ultramide B35 | EMA-1 (15%) | E/EHM-b (5%) | 19.3 13 | 12.7 7.3 | 2.6 2.4 | |
| Ex. 13 | Ultramide B35 | EMA-1 (17.5%) | E/EHM-b (2.5%) | 14.2 10.9 | 3.7 3.2 | 2.3 2.3 | |
| Ex. 14 | Ultramide B3 | EMA-1 (15%) | E/MAA/EHM (5%) | 4.8 7.7 | 3.5 3.1 | NA NA | |
| Ex. 15 | Ultramide B3 | EMA-1 (15%) | E/EHM-b (5%) | 8.5 9.4 | 3.1 3.3 | NA NA | |
| Ex. 16 | Ultramide B3 | LLDPE (15%) | E/EHM-a (5%) | 3.5 9.2 | 3.5 3.8 | 2.9 2.8 | |

The data provided in Tables III, IV and V demonstrate the miscible nature and the improved properties of the blend compositions of this invention. The highlighted properties are optical properties and temperature resistance (upper usage temperature), which are relevant to critical requirements of potential applications of this invention.

Materials Used in Tables III, IV and V

EVA-1 is an ethylene/vinyl acetate copolymer (25 weight % VA) with a MI of 2, available from DuPont as Elvax® 360.

F-1 is a polyethylene/ethyl maleic acid monoester copolymer (90.5 weight % E/9.5 weight % EHM) with MI of 30.

EMA-1 is an ethylene/methyl acrylate copolymer (24 weight % MA) with a MI of 2, available from DuPont.

EMAA-1 is an ethylene/methacrylic acid copolymer (4 weight % MM) with a MI of 7.

EMAA-2 is an ethylene/methacrylic acid copolymer (9 weight % MM) with a MI of 3.

EAA-1 is an ethylene/acrylic acid copolymer (9 weight % AA) with a MI of 10 also comprising an antioxidant.

Temperature resistance was determined in an oven creep test according to the following procedure. A 100-gram weight was attached to a film sample having a thickness of 10 mils, a length of six inches and a width of one inch. The 10 mil films were prepared by press-molding at 190° C. The sample was heat aged in an oven with temperature varied from 70 to 100° C. with 5-degree increments. The temperature at which the film was deformed with more than 10% of elongation or breaks is reported in the Tables below as the Temperature Resistance.

The compositions used in Examples in Tables III, IV and V were prepared by melt blending using a 30-mm diameter twin screw extruder with a mixing screw, using a melt temperature of from 180° C. to 230° C.

Table III summarizes the properties of blends of an ethylene/vinyl acetate copolymer (EVA-1) and E/EHM (F-1).

TABLE III

Miscible Blends of E/EHM and EVA

| Example | Composition (weight ratio) | Haze (%) | Tensile Strength (psi) | Elongation at Break (%) | Tensile Strength at 100% Elongation | Shore A Hardness (psi) | Tear Strength lb/mil resistance | Temperature Resistance |
|---|---|---|---|---|---|---|---|---|
| C6 | EVA-12 | 5.4 | 3130 | 1000 | 650 | 86 | 0.35 | 60° C. |
| C7 | F-1 | 70 | 1800 | 460 | 1500 | 94 | 0.44 | 105° C. |
| 17 | EVA-1/F-1 (70/30) | 17 | 2460 | 900 | 750 | 88 | 0.35 | 80° C. |
| 18 | EVA-1/F-1 (60/40) | 16 | 2430 | 850 | 750 | 90 | 0.41 | 90° C. |
| 19 | EVA-1/F-1 (50/50) | 23 | 2600 | 900 | 800 | 90 | 0.39 | 85° C. |
| 20 | EVA-1/F-1 (40/60) | 48 | 2500 | 800 | 850 | 92 | 0.4 | 95° C. |
| 21 | EVA-1/F-1 (30/70) | 58 | 2220 | 800 | 900 | 93 | 0.41 | >100° C. |

Test Procedures

Haze was measured according to ASTM D1003.

Tensile strength, elongation at break and tensile strength at 100% elongation were measured according to ASTM D882.

Graves tear strength was measured according to ASTM D1004.

Shore A hardness was measured according to ASTM D2240.

Inspection of the data for Examples 17 through 21 in Table 1 shows that the properties of the blends vary linearly as the E/EHM content of the blends increases, suggesting that the blends are miscible. For example, as the E/EHM content of the blends increases the temperature resistance improves. The haze level of the blends also varies linearly with the E/EHM content. Pressed 10-mil films of the blends with up to 50% of E/EHM content exhibit good clarity (low haze). Examples 17 through 21 also show improved tensile strength at 100% elongation, Shore A hardness and tear strength over Comparative Example C6. Transmission electron microscopy (TEM) of Example 17 reveals the presence of one homogeneous phase without detecting the existence of a second phase.

Table IV summarizes the properties of blends of an ethylene/methyl acrylate copolymer (EMA-6) with E/EHM (F-1). Like the blends of EVA and E/EHM, the blends of EMA-6 with F-1 appear to miscible. The blends have higher temperature resistance than pure EMA-6. The film remains relatively clear, though not as good as the films of the blends of EVA and E/EHM.

TABLE IV

Miscible Blends of E/EHM and Ethylene/Methyl acrylate Copolymers

| Example | Composition (weight ratio) | Haze (%) | Tensile Strength (psi) | Elongation at Break (%) | Tensile Strength at 100% Elongation | Shore A Hardness (psi) | Tear Strength lb/mil resistance | Temperature Resistance |
|---|---|---|---|---|---|---|---|---|
| C8 | EMA-6 | 7 | 1780 | 1000 | 500 | 82 | 0.25 | 75 |
| 22 | F-1/EMA-6 (40/60) | 34 | 1800 | 840 | 750 | 88 | 0.32 | 90 |
| 23 | F-1/EMA-6 (60/40) | 55 | 1820 | 760 | 980 | 91 | 0.38 | 100 |

The novel properties of the miscible blends of this invention can be better appreciated by comparing with the blends of EVA with ethylene/(meth)acrylic acid copolymers. By chemical nature, E/EHM is an acid copolymer like ethylene/methacrylic acid copolymers such as EMAA-1 and EMAA-2 or ethylene/acrylic acid copolymers, such as EAA-1. However, the properties of the two blend systems are significantly different. For comparison, Table V summarizes the properties of blends of EVA-1 with acid copolymers EM-1, EMAA-1 or EMAA-2 (Comparative Examples C9 through C15). For comparison, the mole percentage of EHM in F-1 falls in between the mole percentage of MM of EMAA-1 and EMAA-2.

TABLE V

Immiscible Blends of EVA and Acid Copolymers

| Example | Composition (weight ratio) | Haze (%) | Tensile Strength (psi) | Elongation at Break (%) | Tensile Strength at 100% Elongation | Shore A Hardness (psi) | Tear Strength lb/mil resistance | Temperature Resistance |
|---|---|---|---|---|---|---|---|---|
| C6 | EVA-1 | 5.4 | 3130 | 1000 | 650 | 86 | 0.35 | 60 |
| C8 | EAA-1 | 7.2 | 3000 | 620 | 1540 | 93 | 0.5 | 85 |
| C9 | EVA-1/EAA-1 (60/40) | 74 | 2500 | 770 | 850 | 88 | 0.44 | 80 |
| C10 | EVA-1/EAA-1 (40/60) | 80 | 2300 | 660 | 950 | 92 | 0.47 | 85 |
| C11 | EMAA-1 | 67 | 2280 | 650 | 1450 | 94 | 0.51 | 100 |
| C12 | EVA-1/EMMA-1 (60/40) | 84 | 2480 | 820 | 850 | 90 | 0.41 | 90 |
| C13 | EVA-1/EMMA-1 (40/60) | 94 | 2030 | 680 | 1050 | 91 | 0.47 | 95 |
| C14 | E/MAA-2 | 7.6 | 3000 | 620 | 1530 | 93 | 0.53 | 90 |
| C15 | EVA-1/EMAA-2 (60/40) | 81 | 2715 | 800 | 900 | 90 | 0.46 | 85 |
| C16 | EVA-1/EMAA-2 (40/60) | 75 | 2630 | 710 | 1090 | 91 | 0.4 | 90 |

The blends of EVA-1 with EAA-1, EMAA-1 or EMAA-2 exhibit improved temperature resistance, but they provide very hazy films despite the high clarity of the pure components. This is strong evidence that the blends of EVA-1 with EAA-1 or EMAA-2 are immiscible blends. In contrast, the blends of EVA-1 and F-1 shown in Table III provide improved temperature resistance while maintaining better clarity. The other properties of the blends in Table V reflect the nature of immiscible blends, where the major phase dictates the properties.

What is claimed is:

1. A polymeric modifier composition consisting essentially of:
   (a) a first ethylene copolymer component prepared by high pressure free radical copolymerization, wherein said first ethylene copolymer (i) consists essentially of copolymerized units of ethylene and 3-15 weight % copolymerized units of a comonomer selected from the group consisting of maleic anhydride, maleic acid monoesters, maleic acid diesters, fumaric acid monoesters, and mixtures thereof, and (ii) is present in said polymeric modifier composition in an amount of from about 10 to about 50 weight % of the total weight of the polymeric modifier composition; and
   (b) a second ethylene copolymer component, wherein said second ethylene component consists of at least one ethylene copolymer and each ethylene copolymer consists essentially of copolymerized units of ethylene and copolymerized units of 6 to 40 weight % of a polar monomer selected from the group consisting of vinyl acetate, alkyl acrylates, alkyl methacrylates, carbon monoxide and mixtures of two or more thereof, and wherein the second ethylene copolymer component is present in said polymeric modifier composition in an amount of from about 50 to about 90 weight % of the total weight of the polymeric modifier composition.

2. The composition of claim 1 wherein the first ethylene copolymer component is obtained from copolymerization of ethylene and maleic anhydride.

3. The composition of claim 1 wherein the first ethylene copolymer component is obtained from copolymerization of ethylene and a comonomer selected from the group consisting of maleic acid diesters, maleic acid monoesters, fumaric acid monoesters, and mixtures of two or more thereof.

4. The composition of claim 3 wherein the maleic diesters or monoesters are esters of maleic acid and $C_1$ to $C_4$ alcohols.

5. The composition of claim 4 wherein the first copolymer component is obtained from copolymerization of ethylene and a maleic acid monoester.

6. The composition of claim 5 wherein the maleic acid monoester is ethyl hydrogen maleate.

7. The composition of claim 1 wherein at least one ethylene copolymer subcomponent of the second ethylene copolymer component is an ethylene/vinyl acetate copolymer.

8. The composition of claim 1 wherein at least one ethylene copolymer subcomponent of the second ethylene copolymer component is an ethylene/alkyl (meth)acrylate copolymer.

9. A composition of claim 6 wherein the amount of copolymerized maleic acid monoester in the first copolymer component is from about 6 weight percent to about 8 weight percent, based on the total weight of the first copolymer component.

* * * * *